United States Patent [19]

Holm

[11] 3,968,025
[45] July 6, 1976

[54] HYDROCARBON CONVERSION PROCESS

[75] Inventor: Melvin M. Holm, Alameda, Calif.

[73] Assignee: Chevron Research Company, San Francisco, Calif.

[22] Filed: Feb. 20, 1969

[21] Appl. No.: 801,008

[52] U.S. Cl. .............................. 208/135; 208/134; 208/139; 252/441; 252/461; 252/466 PT
[51] Int. Cl.² .................. C10G 35/06; C10G 35/08
[58] Field of Search .......... 252/466, 461, 462, 463; 208/138, 139, 134, 135

[56] References Cited
UNITED STATES PATENTS

| | | | |
|---|---|---|---|
| 2,662,861 | 12/1953 | Riblett et al. | 252/466 |
| 3,073,777 | 1/1963 | Oettinger | 208/112 |
| 3,236,765 | 2/1966 | Erbelding | 208/254 |
| 3,397,137 | 8/1968 | Pickert et al. | 208/138 |
| 3,415,737 | 12/1968 | Kluksdahl | 208/138 |
| 3,434,960 | 3/1969 | Jacobson et al. | 208/138 |

OTHER PUBLICATIONS

"Chemical and Engineering News", Nov. 11, 1968, vol. 46, No. 48, p. 35.
Blackham et al., "Technetium as a Catalyst in Organic Reactions", June 15, 1968, Brigham Young University, Provo, Utah, Released to the public in Mar. 1970, pp. 1 to 12 and the two introductory pages.
Kubicka, "Journal of Catalysis", vol. 12, No. 3, Nov. 1, 1968, pp. 223 to 237, published Feb. 5, 1969.

Primary Examiner—Herbert Levine
Attorney, Agent, or Firm—G. F. Magdeburger; R. H. Davies; W. D. Reese

[57] ABSTRACT

Hydroconversion of hydrocarbons, particularly reforming of naphthas, is conducted in the presence of hydrogen with a catalyst comprising technetium in association with a porous solid carrier. Preferably the catalyst contains a platinum group component in addition to technetium.

3 Claims, 1 Drawing Figure

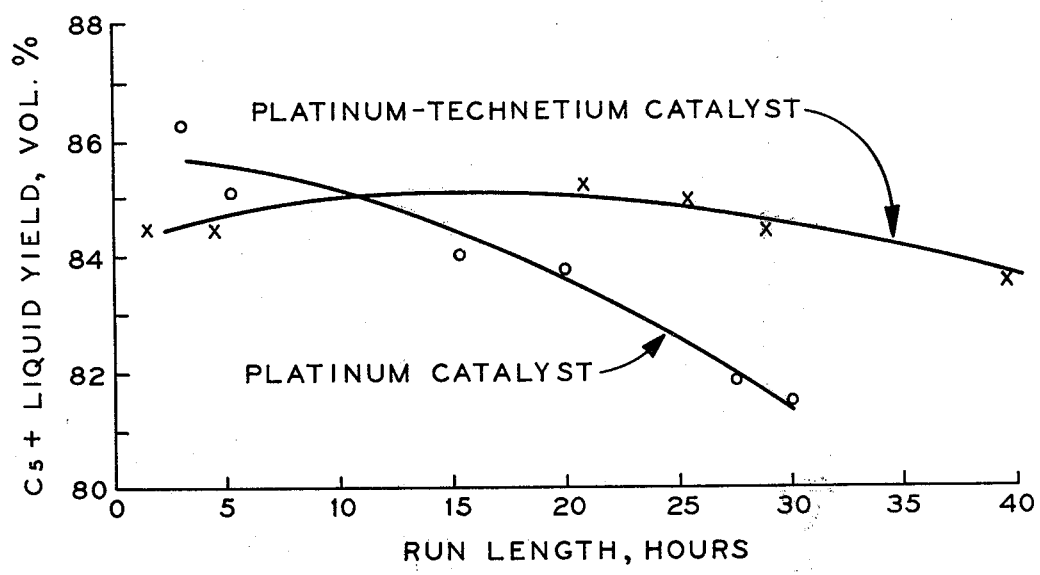

HYDROCARBON CONVERSION PROCESS

BACKGROUND OF THE INVENTION

1. Field

The present invention relates to hydrocarbon hydroconversion processes, and more particularly, to reforming processes. Still more particularly, the present invention is concerned with a novel catalytic composition and a process for the hydroconversion of hydrocarbon in the presence of the novel catalyst. The novel catalyst comprises technetium, or a compound of technetium, associated with a porous solid carrier.

2. Prior Art

Hydrocarbon hydroconversion processes, such as hydrocracking, hydrogenation, hydrofining, isomerization and reforming, are of special importance in the petroleum industry as a means of improving the quality and usefulness of hydrocarbons. The requirement for a diversity of hydrocarbon products, including, for example, high quality gasoline, has led to the development of many catalysts and procedures for converting hydrocarbons in the presence of hydrogen to useful products. A particularly important hydrocarbon hydroconversion process is reforming. Although many features of the present invention may be discussed in terms of reforming, it is to be understood that the present invention relates to other hydroconversion processes as well.

Catalytic reforming refers to the treatment of naphtha fractions to improve the octane rating. Most catalytic reforming operations are characterized by employing catalysts comprising dehydrogenation-promoting metal components associated with porous solid carriers, which catalysts selectively promote such hydrocarbon reactions as dehydrogenation of naphthenes to aromatics, dehydrocyclization of paraffins to naphthenes and aromatics, isomerization of normal paraffins to isoparaffins, and hydrocracking of relatively long-chained paraffins. Most catalysts used in reforming processes comprise platinum group components, particularly platinum, in association with porous solid carriers, for example, alumina. Research efforts have been expanded to seek substitutes for platinum and/or to find catalytic promoters to use with platinum catalysts to increase their activity, stability, and/or gasoline yield-octane number selectivity.

SUMMARY OF THE INVENTION

In accordance with the present invention, an improved hydroconversion process can be conducted in the presence of a catalyst comprising technetium associated with a porous solid carrier. Preferably the technetium is present in an amount of from 0.01 to 10 weight percent based on the finished catalyst. Still more preferably, a platinum group component is present with the technetium on the porous solid carrier. The hydrocarbon hydroconversion process is preferably the reforming of naphtha or gasoline fractions to produce high octane products.

Also, in accordance with the present invention, a novel catalytic composition of matter has been discovered comprising a porous solid carrier having associated therewith from 0.01 to 10 weight percent technetium. The novel catalyst of the present invention is found to be highly active and stable for the reforming of naphtha and gasoline boiling range hydrocarbons and, in fact, is superior to commercial reforming catalysts containing only a platinum group component.

BRIEF DESCRIPTION OF THE DRAWING

The present invention will be better understood and will be further explained hereinafter with reference to the graph in the FIGURE which shows, for comparison purposes, data from simulated life tests indicating the reforming stability of a conventional catalyst comprising platinum associated with an alumina support and a catalyst comprising platinum and technetium associated with an alumina support. Conditions of operation were more severe than normally used in reforming operations in order to simulate the response of the catalysts to much longer tests (life tests).

The graph in the FIGURE shows as a function of time onstream the yield of $C_5+$ liquid product or gasoline having 99 F-1 clear octane rating produced during reforming with each of the two catalysts. It is evident that the catalyst comprising platinum and technetium has better yield stability for the reforming of naphtha to high octane gasoline product, than the catalyst comprising platinum without technetium.

DESCRIPTION OF THE INVENTION

The porous solid carrier or support which is employed in the preparation of the catalyst of the present invention can be any of a large number of materials upon which catalytically active amounts of technetium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of greater than 50 $m^2/gm$ and preferably greater than about 150 $m^2/gm$. Generally, the porous inorganic oxides which are useful as catalyst supports for the present invention have surface areas of from about 50 to 750 $m^2/gm$. Suitable inorganic oxides which can be used for the catalyst of the present invention include the oxides of the metals or nonmetals of Groups II – IV of the Periodic Table. Natural or synthetically produced inorganic oxides or combinations thereof can be used. Typical acidic inorganic oxide supports which can be used are the naturally occurring aluminum silicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates. For hydrocracking processes it is generally preferred that the carrier comprises a siliceous oxide. Generally, preferred hydrocracking catalysts contain silica-alumina, particularly silica-alumina having a silica content in the range of 30 to 99 weight percent.

For reforming processes, it is generally preferred that the catalyst has low cracking activity, that is, has limited acidity. It is preferred for reforming processes to use inorganic oxide carriers such as magnesia and alumina. Alumina is particularly preferred for purposes of this invention. Any of the forms of alumina suitable as a support for reforming catalysts can be used. Furthermore, alumina can be prepared by a variety of methods satisfactory for the purposes of this invention. Thus the alumina may be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The catalyst in the present invention comprises technetium in an amount of from 0.01 to 10 weight percent, preferably 0.01 to 5 weight percent. More preferably technetium is present in an amount of from 0.1 to 3 weight percent. Technetium may exist on the catalyst in the metallic form or as a compound. Reference to "technetium" is meant to refer to both the metal and the compound form of technetium. Regardless of the form in which technetium exists on the catalyst, whether as metal or compound, the weight percent is calculated as the metal.

Other catalytic components can be present with technetium in association with the porous solid carrier. Thus, for example, Group VI and Group VIII metals, or compounds thereof, in an amount, e.g., of from 0.01 to 20 weight percent can be present with technetium, or compounds thereof, in association with a porous solid carrier. It is particularly preferred that the Group VIII metals or compounds thereof be present in association with technetium and more preferably that the platinum group components be present in association with the technetium. For reforming processes it is particularly preferred that platinum be present with the technetium-containing catalyst. When a platinum group component is present in association with the porous solid carrier, it is preferred that the platinum group component be present in an amount of from 0.01 to 3 weight percent and preferably 0.1 to 2 weight percent, based on the finished catalyst. The platinum group component embraces all of the members of Group VIII of the Periodic Table having an atomic weight greater than 100 as well as compounds and mixtures of any of these. Thus, the platinum group components are the Group VIII noble metals or compounds thereof. Platinum is preferred because of its better performance in reforming. Regardless of the form in which the platinum group component exists on the carrier, whether as metal or compound, the weight percent is calculated as the metal.

Technetium can be associated with the porous solid inorganic oxide by suitable techniques such as ion-exchange, coprecipitation, etc. Preferably the technetium is associated with the porous solid carrier by impregnation. When another metal component is associated with the carrier in addition to technetium, one of the components can be associated with the carrier by one procedure, for example, ion-exchange, and the other component associated with the carrier by another procedure, for example, impregnation. In general the carrier material is impregnated with an aqueous solution of a decomposable compound of technetium in sufficient concentration to provide the desired quantity of technetium on the finished catalyst. The resulting mixture is then heated to remove water. Technetium compounds suitable for incorporation onto the carrier include, among others, ammonium pertechnetate, hydrogen pertechnetate, etc. The technetium can be associated with the carrier at any stage of catalyst preparation. For example, technetium can be incorporated onto an alumina support while the alumina is in the sol or gel form, followed by precipitation of the alumina. Alternately, a previously preferred alumina carrier can be impregnated with a water solution of a technetium compound.

When incorporating a platinum group component with the porous solid carrier, the platinum group component can be incorporated simultaneously with technetium or prior to or subsequent to the incorporation of technetium. The platinum group component is preferably associated with the porous solid carrier by impregnation. Preferably the porous solid carrier is impregnated with an aqueous solution of a decomposable compound of platinum, palladium, rhodium, ruthenium, etc. in sufficient concentration to provide the desired concentration of the platinum group component on the finished catalyst. To incorporate platinum onto the porous solid carrier, chloroplatinic acid is preferred. Other platinum group compounds are ammonium chloroplatinates, polyammineplatinum salts, palladium chloride, tetraammineplatinous nitrate, etc.

Following incorporation of the porous solid carrier with technetium, the resulting composite is usually dried by heating at a temperature of, for example, no greater than 500°F and preferably at about 200° to 400°F. Thereafter the composite can be calcined at an elevated temperature of, for example, up to about 1200°F, if desired. Following calcination, the catalyst containing technetium is preferably heated at an elevated temperature in the presence of hydrogen. It is particularly preferred that this treatment with hydrogen be accomplished at a temperature in the range of from 600° to 1300°F and preferably, 600° to 1000°F.

It may be desirable to promote the catalyst for hydrocarbon hydroconversion reactions by the addition of halides, particularly fluoride or chloride. Bromides may also be used. The catalyst promoted with halide preferably contains from 0.1 to 10 weight percent, preferably 0.1 to 3 weight percent, total halide content. The halides may be incorporated onto the catalyst at any suitable stage of catalyst manufacture, e.g., prior to or following incorporation of the technetium. Generally, the halides can be combined with the catalyst by contacting suitable compounds such as hydrogen fluoride, ammonium fluoride, hydrogen chloride, and ammonium chloride, either in the gaseous form or in the water soluble form with the catalyst. Preferably the fluoride or chloride is incorporated with the catalyst from an aqueous solution containing the halide. Often halide is incorporated with the catalyst by impregnating with an aqueous solution of a halide compound of technetium or another metal, e.g., platinum. Thus, for example, impregnation with chloroplatinic acid normally results in chloride addition to the catalyst.

The novel catalytic composition of the present invention may find utility for various hydrocarbon hydroconversion reactions including hydrofining, hydrogenation, reforming, dealkylation, dehydrocyclization, isomerization, cracking and hydrocracking. The catalyst composition of the present invention is most advantageously used for reforming. The hydrocarbon feeds employed and the reaction conditions used will depend on the particular hydrocarbon hydroconversion process involved and are generally well known in the petroleum art. The conditions of temperature and pressure, hydrogen flow rate, and liquid hourly space velocity in the reaction zone can be correlated and adjusted depending on the particular feedstock utilized, the particular hydrocarbon hydroconversion process, and the products desired. For example, hydrocracking operations are generally accomplished at a temperature of from about 450° to 900°F and a pressure between about 500 to 10,000 psig. Preferably pressures between 1200 to 6000 psig are used. The hydrogen flow rate into the reactor is maintained between 1000 to 20,000 SCF/bbl of feed and preferably in the range 4000 to 10,000 SCF/bbl. The liquid hourly space velocity (LHSV) will generally be in the range of from 0.1 to 10 preferably from 0.3 to 5.

As indicated above, the catalyst of the present invention is preferably employed in reforming. The feedstock desirably used for reforming is a light hydrocarbon oil, e.g., a naphtha fraction. Generally, the naphtha will boil in the range falling within the limits of from 70° to 550°F and preferably from 150° to 450°F. The feedstock can be, for example, either a straight run naphtha or a thermally cracked or catalytically cracked naphtha or blends thereof. The feedstock should preferably be low in sulfur, i.e., preferably contain less than 10 ppm sulfur and more preferably less than 5 ppm sulfur.

Reforming conditions will depend in large measure on the feed used, whether highly aromatic, paraffinic or napthenic, and upon the desired octane rating of the product. The temperature in the reforming process will generally be in the range of about 600° to 1100°F and preferably about 700° to 1050°F. The pressure in the reforming reaction zone can be atmospheric or superatmospheric. The pressure will generally lie within the range of from 25 to 1000 psig and preferably from about 50 to 750 psig. The temperature and pressure can be correlated with the liquid hourly space velocity (LHSV) to favor any particularly desirable reforming reaction as, for example, aromatization, isomerization, or dehydrogenation. Generally, the liquid hourly space velocity will be from 0.1 to 10, and preferably from 1 to 5.

Reforming of a naphtha is accomplished by contacting the naphtha at reforming conditions and in the presence of hydrogen with the desired catalyst. Reforming generally results in the production of hydrogen. The hydrogen produced during the reforming process is generally recovered from the reaction products and preferably at least part of said hydrogen is recycled to the reaction zone. Thus, excess or make-up hydrogen need not necessarily be added to the reforming process, although, it is sometimes preferred to introduce excess hydrogen at some stage of the operation, for example, during startup. Hydrogen, either as recycle or make-up hydrogen, can be added to the feed prior to contact with the catalyst or can be contacted simultaneously with the introduction of feed to the reaction zone. Generally, during startup of the process, hydrogen is recirculated over the catalyst prior to contact of the feed with the catalyst. Hydrogen is preferably introduced into the reforming reaction at a rate of from about 0.5 to 20 moles of hydrogen per mole of feed. The hydrogen can be in admixture with light gaseous hydrocarbons.

After a period of operation when the catalyst becomes deactivated by the presence of carbonaceous deposits, the catalyst can be reactivated or regenerated by passing an oxygen-containing gas, such as air, into contact with the catalyst at an elevated temperature in order to burn carbonaceous deposits from the catalyst. The method of regenerating the catalyst will depend on whether there is a fixed bed, moving bed, or fluidized bed operation.

The process of the present invention will be more readily understood by reference to the following Example.

EXAMPLE

A catalyst comprising technetium in association with alumina was prepared as follows: 11.8 grams of a composite containing 0.6 weight percent platinum and 0.6 weight percent chloride associated with alumina was contacted with a solution of ammonium pertechnetate ($NH_4TcO_4$). The ammonium pertechnetate solution was prepared by diluting 2.1 milliliters of ammonium pertechnetate solution (concentration approximately 1 gram of technetium to 30 milliliters of solution) with 6.5 milliliters of water. Following impregnation of the alumina with the ammonium pertechnetate solution, the impregnated catalyst was dried in flowing nitrogen for 2 hours at 212°–248°F. The dried catalyst was then heated at 500°F for 15 minutes in flowing air, then heated at 700°F for 60 minutes in flowing air. The catalyst was next heated for 10 minutes at 500°F in flowing hydrogen, then for 60 minutes at 930°F. The resulting catalytic composite contained 0.6 weight percent platinum, 0.6 weight percent chloride, and 0.6 weight percent technetium in association with alumina.

The catalyst was tested for reforming of a naphtha feedstock having a boiling range of 151° to 428°F and comprising 23.4 volume percent aromatics, 36.5 volume percent paraffins, and 40.1 volume percent naphthenes. The feed was essentially sulfur free. The reforming conditions included a pressure of 160 psig, a liquid hourly space velocity of 4 and a hydrogen to hydrocarbon mole ratio of 4; once-through hydrogen was used. The temperature was adjusted to maintain conversion to 99 F-1 clear octane product.

For comparison purposes, a catalyst comprising 0.6 weight percent platinum and 0.6 weight percent chloride in association with alumina was also tested for reforming at the same reaction conditions and with the same feed as that described above for the platinum-technetium catalyst. The platinum containing catalyst was contacted with flowing hydrogen for 10 minutes at 500°F and 60 minutes at 930°F, prior to contact with the naphtha feed. Both catalysts were treated with $H_2S$ prior to reforming in order to sulfide the catalysts.

The reforming process was conducted under conditions to simulate an accelerated life test for the catalysts. That is, conditions were not necessarily maintained at levels used in a commercial reforming process but, in general, were much more severe in order to test, in a relatively few hours how well the catalyst would perform in a commercial operation.

The change in yield of $C_5+$ gasoline product over the period of the run was measured for each catalyst to give an indication of the yield stability of the catalyst. The $C_5+$ gasoline produced having an octane rating of 99 F-1 clear for each catalyst is shown in the FIGURE.

The response of the platinum catalyst to the simulated life test was relatively poor. As seen from the FIGURE, the yield of $C_5+$ liquid product having the desired octane rating decreased significantly with time. On the other hand the catalyst containing platinum and technetium performed remarkably well during the reforming test. As seen in the FIGURE the naphtha feed was reformed to yield nearly 85 volume percent $C_5+$ product having a 99 F-1 clear octane rating over almost the entire period of the test. It is apparent that technetium greatly improves the stability of the platinum catalyst for reforming.

The foregoing disclosure of this invention is not to be considered as limiting since many variations can be made by those skilled in the art without departing from the scope or spirit of the appended claims.

I claim:

1. A catalytic composite comprising a combination of a platinum group metallic component, a technetium component, and a halogen component with an alumina carrier material, said components being present in amounts sufficient to result in the catalytic composite containing, on an elemental basis, about 0.1 to about 10 weight percent halogen, about 0.01 to about 3 weight percent of platinum group metal and about 0.01 to about 10 weight percent technetium.

2. A process for reforming a gasoline fraction which comprises contacting the gasoline fraction and hydrogen with the catalytic composite of claim 1 at reforming conditions.

3. A process for increasing the octane number of hydrocarbons boiling within the gasoline range comprising contacting the hydrocarbons with a catalyst consisting of technetium on an inert support under reforming conditions.

* * * * *